United States Patent
Jung et al.

(10) Patent No.: US 11,552,392 B2
(45) Date of Patent: Jan. 10, 2023

(54) ELECTRONIC DEVICE INCLUDING ANTENNA MODULE

(71) Applicant: Samsung Electronics Co., Ltd., Gyeonggi-do (KR)

(72) Inventors: Sangmin Jung, Gyeonggi-do (KR); Geunwoo Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 481 days.

(21) Appl. No.: 16/571,544

(22) Filed: Sep. 16, 2019

(65) Prior Publication Data
US 2020/0144713 A1    May 7, 2020

(30) Foreign Application Priority Data
Nov. 7, 2018  (KR) .................... 10-2018-0135770

(51) Int. Cl.
*H01Q 1/52* (2006.01)
*H04W 76/10* (2018.01)
(Continued)

(52) U.S. Cl.
CPC ........... *H01Q 1/523* (2013.01); *G06F 13/385* (2013.01); *H04W 76/10* (2018.02); *H04W 36/0072* (2013.01); *H04W 88/04* (2013.01)

(58) Field of Classification Search
CPC ......... H01Q 1/523; H01Q 1/243; H01Q 9/42; H01Q 21/061; H01Q 25/00; G06F 13/385;
(Continued)

(56) References Cited

U.S. PATENT DOCUMENTS 8,798,695 B1 * 8/2014 Zheng ................ H01Q 21/28
  455/575.7
10,313,950 B2   6/2019 Choi et al.
(Continued)

FOREIGN PATENT DOCUMENTS

KR    10-2008-0073138 A    8/2008
KR    10-2017-0062438 A    6/2017
(Continued)

OTHER PUBLICATIONS

International Search Report dated Jan. 3, 2020.

*Primary Examiner* — Dimary S Lopez Cruz
*Assistant Examiner* — Michael M Bouizza
(74) *Attorney, Agent, or Firm* — Cha & Reiter, LLC

(57) ABSTRACT

An electronic device comprises a plurality of antennas, wherein each of the plurality of antennas are spaced apart from each other, a first communication circuit electrically connected with the plurality of antennas, a plurality of array antennas comprising a first array antenna disposed adjacent to at least one of the plurality of antennas, and a second array antenna disposed adjacent to another antenna different from the at least one antenna of the plurality of antennas, a second communication circuit electrically connected with the first array antenna and the second array antenna, and at least one control circuit electrically connected with the first communication circuit and the second communication circuit, wherein the at least one control circuit is configured to obtain receive sensitivities of the plurality of antennas through the first communication circuit; activate at least one array antenna of the first array antenna and the second array antenna through the second communication circuit based on at least the receive sensitivities; and control the activated at least one array antenna to form at least one beam for communication with an external electronic device.

4 Claims, 11 Drawing Sheets

(51) Int. Cl.
*G06F 13/38* (2006.01)
*H04W 88/04* (2009.01)
*H04W 36/00* (2009.01)

(58) Field of Classification Search
CPC . H04W 76/10; H04W 36/0072; H04W 88/04; H04W 24/08; H04B 7/0608; H04B 7/0617; H04B 7/0691; H04B 1/40; H04B 17/318; H04M 1/724; H04M 2201/34; H04M 2201/36; H04M 2201/38
See application file for complete search history.

(56) References Cited

U.S. PATENT DOCUMENTS

| | | |
|---|---|---|
| 10,382,614 B2 | 8/2019 | Novet |
| 2015/0201385 A1* | 7/2015 | Mercer ............... H04B 1/3838 |
| | | 455/67.11 |
| 2015/0237183 A1 | 8/2015 | Novet |
| 2017/0272998 A1 | 9/2017 | Choi et al. |
| 2017/0356980 A1 | 12/2017 | Islam et al. |
| 2019/0280370 A1 | 9/2019 | Ryu et al. |
| 2020/0091608 A1* | 3/2020 | Alpman ............... H01Q 25/001 |

FOREIGN PATENT DOCUMENTS

| | | |
|---|---|---|
| WO | 2015/156577 A1 | 10/2015 |
| WO | 2018/084327 A1 | 5/2018 |

\* cited by examiner

ELECTRONIC DEVICE INCLUDING ANTENNA MODULE

CROSS-REFERENCE TO RELATED APPLICATION(S)

This application is based on and claims priority under 35 U.S.C. § 119 to Korean Patent Application No. 10-2018-0135770, filed on Nov. 7, 2018, in the Korean Intellectual Property Office, the disclosure of which is incorporated by reference herein its entirety.

BACKGROUND

1. Field

The disclosure relates to an electronic device including an antenna module.

2. Description of Related Art

As an information technology (IT) develops, various types of electronic devices such as a smartphone, a tablet personal computer (PC), and the like are being widely supplied. An electronic device may perform wireless communication with any other electronic device or a base station by using an antenna module.

Nowadays, as the network traffic of the mobile device sharply increases, [MD1]technology to accommodate the increase in network traffic is being developed. As the frequency of the signal increases, a wavelength of the signal may become shorter, and thus, the antenna can be reduced in size. Also, because a bandwidth is able to be used more widely, a significant amount of information may be transmitted or received.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprises a plurality of antennas, wherein each of the plurality of antennas are spaced apart from each other; a first communication circuit electrically connected with the plurality of antennas; a plurality of array antennas comprising a first array antenna disposed adjacent to at least one of the plurality of antennas, and a second array antenna disposed adjacent to another antenna different from the at least one antenna of the plurality of antennas; a second communication circuit electrically connected with the first array antenna and the second array antenna; and at least one control circuit electrically connected with the first communication circuit and the second communication circuit, wherein the at least one control circuit is configured to: obtain receive sensitivities of the plurality of antennas through the first communication circuit; activate at least one array antenna of the first array antenna and the second array antenna through the second communication circuit based at least on the receive sensitivities; and control the activated at least one array antenna to form at least one beam for communication with an external electronic device.

In accordance with another aspect of the disclosure, an electronic device may include a first antenna that is disposed in a first region, a second antenna that is disposed in a second region, a first array antenna that includes a plurality of antenna elements and is disposed in the first region, a second array antenna that includes a plurality of antenna elements and is disposed in the second region, a first communication circuit that is electrically connected with the first antenna and the second antenna, a second communication circuit that is electrically connected with the first array antenna and the second array antenna, and at least one control circuit that is electrically connected with the first communication circuit and the second communication circuit. The at least one control circuit may identify whether there is gripped at least one region of the first region and the second region, by using at least one antenna of the first antenna and the second antenna through the first communication circuit, may perform communication by using the second array antenna through the second communication circuit when the first region is gripped, and may perform communication by using the first array antenna through the second communication circuit when the second region is gripped.

In accordance with another aspect of the disclosure, an electronic device may include an antenna that is disposed in a specified region of the electronic device, an array antenna that is disposed in the specified region, a first communication circuit that is electrically connected with the antenna, a second communication circuit that is electrically connected with the array antenna, and at least one control circuit that is electrically connected with the first communication circuit and the second communication circuit. The at least one control circuit may control the first communication circuit so as to receive an electrical signal by using the antenna, may identify whether there is gripped the specified region, by using the antenna, may activate the array antenna through the second communication circuit when the specified region is not gripped, and may deactivate the array antenna through the second communication circuit when the specified region is gripped.

In accordance with another aspect of the disclosure, a method of searching for an optimum beam for communicating with an external electronic device by using a millimeter wave signal may include obtaining receive sensitivities of a plurality of antennas, activating at least one array antenna of a first array antenna and a second array antenna based at least on the obtained receive sensitivities, and forming at least one beam for communicating with the external electronic device, by using the activated at least one array antenna.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar components may be marked by similar reference numerals.

DETAILED DESCRIPTION

As well as the millimeter wave signal, signals in the ultrahigh frequency band may have directional strength. To perform communication using signals in the ultrahigh frequency band, an electronic device may form at least one beam and may search for a direction, in which a signal in the ultrahigh frequency band is incident, by using the formed beam. For example, the electronic device may track a direction of a beam incident from a base station or any other electronic device while changing the direction of the formed beam.

The electronic device may include a 5G antenna module for 5G communication. The 5G antenna module may include an array antenna implemented with a plurality of antenna elements. The electronic device may form a beam by using the array antenna and may also form a plurality of beams by using a plurality of 5G antenna modules.

A gain of a beam that is formed when the electronic device uses a plurality of 5G antenna modules may be improved, but power consumption may also increase. Also, when a plurality of 5G antenna modules are used, a longer time may be taken to search for a beam optimized to transmit/receive a signal. For example, in any one of the plurality of 5G antenna modules, a gain of a beam may be a specified level or lower due to a disposed location, a direction, a user grip, or the like. In the case where the one antenna module is used to search for an optimum beam, a decrease in efficiency and an increase in a search time may be caused.

Aspects of the disclosure may address at least the above-mentioned problems and/or disadvantages and to provide at least the advantages described below. Accordingly, an aspect of the disclosure is to provide an electronic device for solving the above-described problem and problems brought up in this specification.

Figure 1A:
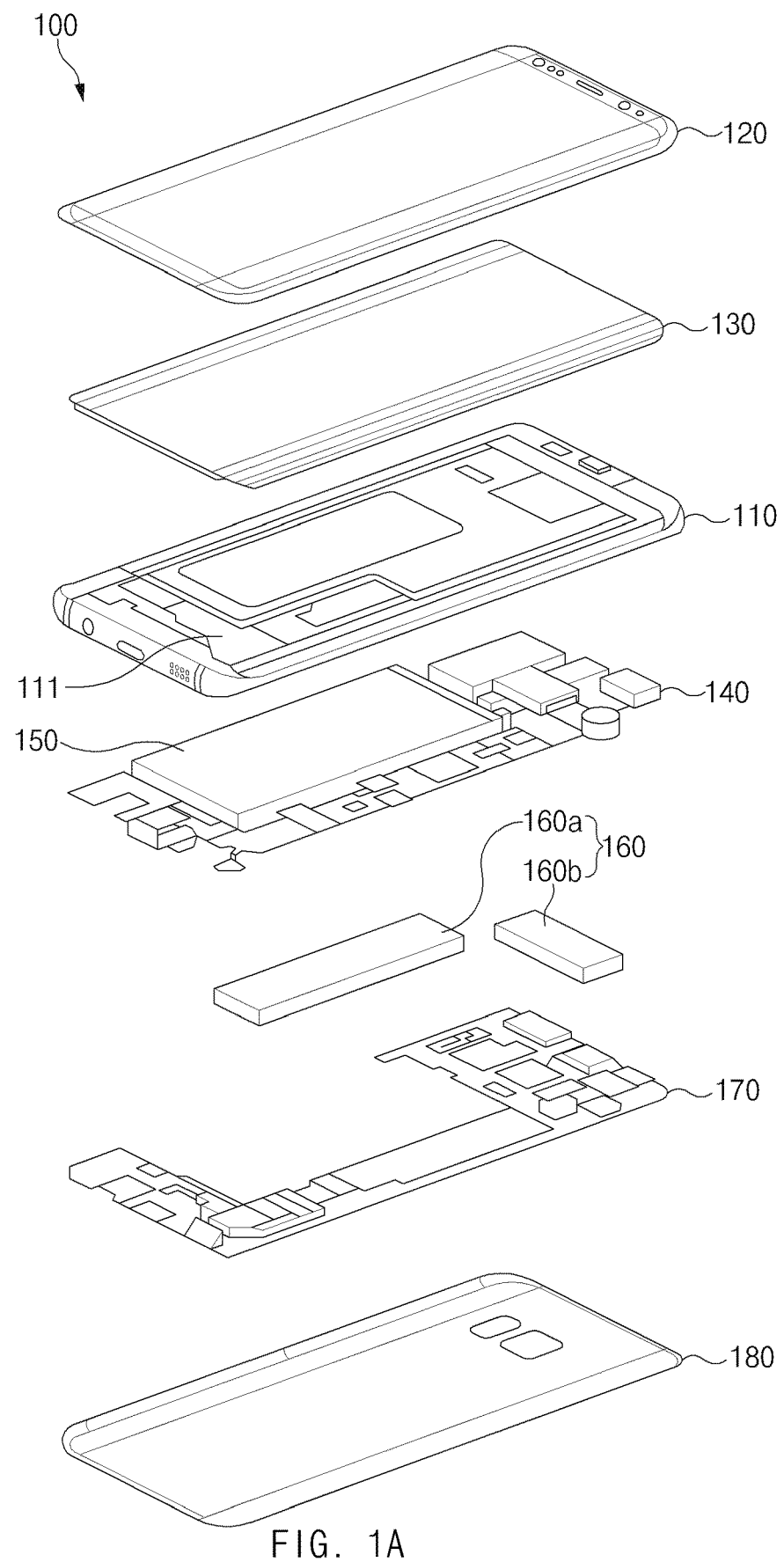
FIG. 1A is an exploded perspective view of an electronic device, according to an embodiment.

FIG. 1A is an exploded perspective view of an electronic device, according to an embodiment.

Referring to FIG. 1A, an electronic device 100 may include a side bezel structure 110, a first support member 111 (e.g., a bracket), a front plate 120, a display 130, a printed circuit board (PCB) 140, a battery 150, a 5G antenna module 160, a second support member 170 (e.g., a rear case), and a back plate 180. In any embodiment, the electronic device 100 may not include one or more (e.g., the first support member 111 or the second support member 170) of the components illustrated in FIG. 1A or may further include any other component not illustrated in FIG. 1A.

The side bezel structure 110 may be combined with the front plate 120 and the back plate 180 to form a housing of the electronic device 100. The housing may form the exterior of the electronic device 100 and may protect components disposed in the electronic device 100 against an external environment (e.g., moisture or impact). In an embodiment, the side bezel structure 110 may form a side surface of the housing together with a portion of the front plate 120 and/or a portion of the back plate 180. The side surface may be understood as a region that surrounds a space between a first surface on which the front plate 120 is disposed and a second surface on which the back plate 180 is disposed. In this specification, the front plate 120 may be referred to as a "first plate", and the back plate 180 may be referred to as a "second plate".

According to an embodiment, at least a portion of the side bezel structure 110 may include a conductive region. In certain embodiments, the conductive region may be fed with a power to cause an electromagnetic resonance. The electronic device 100 may transmit or receive a signal in a specified frequency band by using the electromagnetic resonance. In an embodiment, the specified frequency band may be 600 MHz or higher and 6 GHz or lower.

According to an embodiment, the conductive region may be disposed at an outer portion of the side bezel structure 110 and may include a plurality of segmented regions. For example, the conductive region may be segmented to have a specified length for the purpose of transmitting or receiving a signal in a specified frequency band. The segmented conductive regions may operate as individual antennas, respectively. In an embodiment, the individual antennas may be disposed in different regions of an outer portion of the electronic device 100. For example, a first antenna may be disposed on an upper side of the outer portion of the electronic device 100, and a second antenna may be disposed on a lower side of the electronic device 100. For another example, a third antenna may be disposed on a left side of the outer portion of the electronic device 100, and a fourth antenna may be disposed on a right side of the electronic device 100. However, the arrangement (or layout) of the plurality of individual antennas is not limited to the above description.

The first support member 111 may be disposed in the electronic device 100, and may be connected with the side bezel structure 110 or may be integrally formed with the side bezel structure 110. In an embodiment, the first support member 111 may support or fix electronic components disposed in the electronic device 100, for example, the printed circuit board 140, electronic components disposed on the printed circuit board 140, or various kinds of modules (e.g., the 5G antenna module 160) performing various functions, on a side of the front plate 120.

The front plate 120 may be combined with the side bezel structure 110 and the back plate 180 to form the housing. In an embodiment, the front plate 120 may protect an internal component of the electronic device 100, for example, the display 130 against impact coming from a front surface of the electronic device 100. According to certain embodiments, the front plate 120 may transmit a light generated from the display 130 or a light incident onto various kinds of sensors (e.g., an image sensor, an iris sensor, a proximity sensor, or the like) disposed on the front surface of the electronic device 100.

The display 130 may be disposed adjacent to one surface of the front plate 120. According to certain embodiments, the display 130 may be electrically connected with the printed circuit board 140 to output content (e.g., a text, an image, a video, an icon, a widget, a symbol, or the like) or to receive a touch input (e.g., a touch, a gesture, a hovering, or the like) from the user.

Various electronic components, various elements, or various printed circuits of the electronic device 100 may be mounted on the printed circuit board 140. For example, an application processor (AP), a communication processor (CP), or an intermediate frequency integrated circuit (IFIC) a communication circuit (e.g., a second communication circuit 240 of FIG. 2), or the like may be mounted on the printed circuit board 140. Hereinafter, the user of the term "processor" shall be understood to include both the singular and plural contexts.

The battery 150 may convert chemical energy and electrical energy bidirectionally. For example, the battery 150 may convert chemical energy into electrical energy and may supply the converted electrical energy to the display 130 and various components or modules mounted on the printed circuit board 140. According to an embodiment, a power management module for managing the charging and discharging of the battery 150 may be included in the printed circuit board 140.

The 5G antenna module 160 may be disposed adjacent to an outer portion of the electronic device 100, for example, a side surface of the housing. For example, in the case where the housing is formed in the shape of a rectangle or substantially a rectangle as illustrated in FIG. 1A, the 5G antenna module 160 may be disposed adjacent to each edge or each corner of the side surface of the housing. For another example, in the case where the housing is formed in the shape of a circle, the 5G antenna module 160 may be disposed to be spaced from the center of the circle as much as a specified distance toward the side surface.

According to an embodiment, the 5G antenna module 160 may be disposed adjacent to the plurality of segmented conductive regions included in the side bezel structure 110, for example, to a plurality of antennas. The electronic device 100 may transmit or receive a signal in a frequency band ranging from 20 GHz to 100 GHz, a so-called millimeter wave signal, by using the 5G antenna module 160. In this specification, the 5G antenna module 160 may be referred to as an "antenna structure", an "array antenna", or a "communication device".

According to an embodiment, the electronic device 100 may include at least one or more 5G antenna modules 160. For example, the electronic device 100 may include a first 5G antenna module 160*a* and a second 5G antenna module 160*b*. In an embodiment, the first 5G antenna module 160*a* and the second 5G antenna module 160*b* may be disposed to face different directions. In an embodiment, the first 5G antenna module 160*a* and the second 5G antenna module 160*b* may receive signals incident in different directions, for example, directions perpendicular to each other or may transmit signals in the different directions. According to certain embodiments, unlike the example illustrated in FIG. 1A, the electronic device 100 may include three or more 5G antenna modules 160.

The second support member 170 may be interposed between the back plate 180 and the printed circuit board 140. According to an embodiment, like or as in the first support member 111, the second support member 170 may support or fix the electronic components in the electronic device 100, on a side of the back plate 180.

The back plate 180 may be combined with the side bezel structure 110 and the front plate 120 to form the housing. In an embodiment, the back plate 180 may protect an internal component of the electronic device 100 against impact coming from a back surface of the electronic device 100.

Figure 1B:
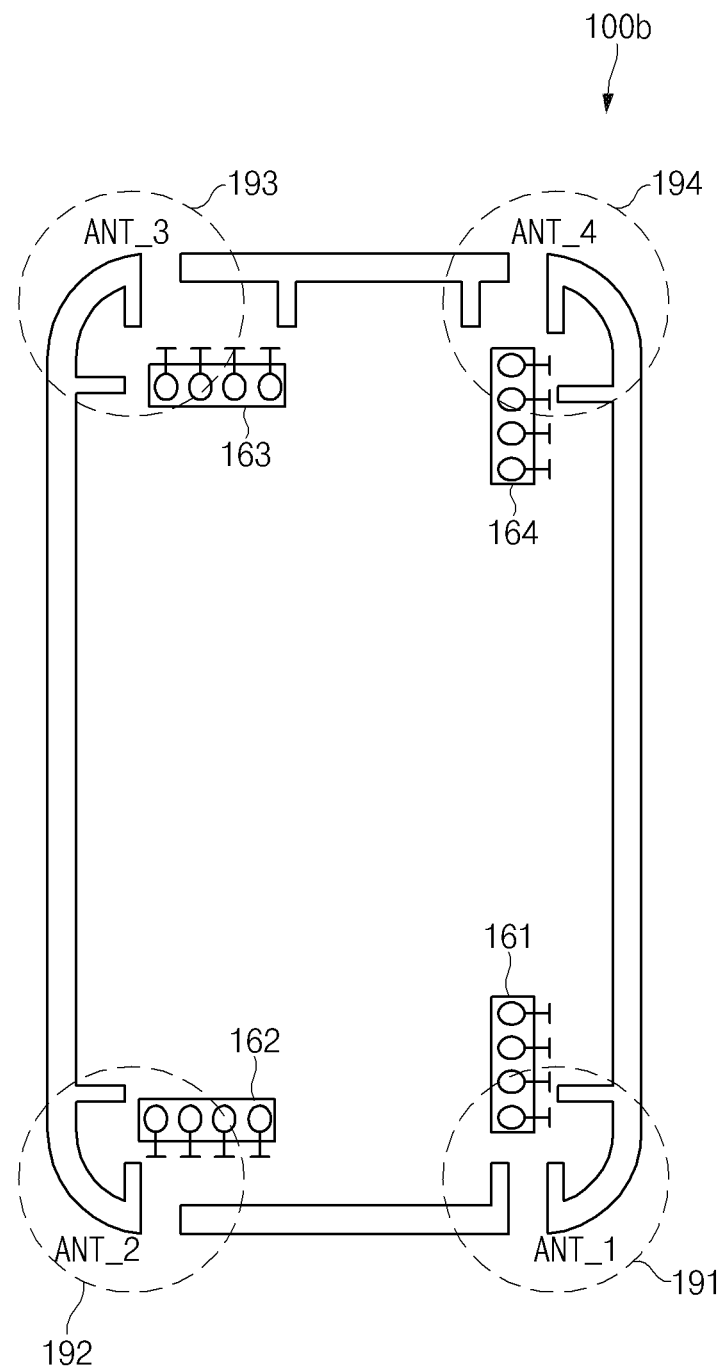
FIG. 1B illustrates an arrangement of an antenna and an array antenna in an electronic device, according to an embodiment.

FIG. 1B illustrates an arrangement of an antenna and an array antenna in an electronic device, according to an embodiment.

Referring to FIG. 1B, an electronic device may include a plurality of antennas and a plurality of array antennas. According to an embodiment, the plurality of antennas may be included in at least a portion of the side bezel structure 110 illustrated in FIG. 1A.

According to an embodiment, a first antenna ANT_1 may be disposed at a first corner 191. Second antenna ANT_2 may be disposed at a second corner 192. A third antenna ANT_3 may be disposed at a third corner 193. A fourth antenna ANT_4 may be disposed at a fourth corner 194. In an embodiment, the first antenna to the fourth antenna may be spaced from each other.

According to an embodiment, a first array antenna 161 may be disposed adjacent to the first antenna ANT_1, a second array antenna 162 may be disposed adjacent to the second antenna ANT_2, a third array antenna 163 may be disposed adjacent to the third antenna ANT_3, and a fourth array antenna 164 may be disposed adjacent to the fourth antenna ANT_4. In certain embodiments, an antenna and an array antenna disposed adjacent to each other, for example, the first antenna ANT_1 and the first array antenna 161 may have a particular electric field relationship when a user grip is made, with regard to a proximate region of the electronic device, for example, the first corner 191. For example, when a user grip is made in the vicinity of the first corner 191 where the first antenna ANT_1 and the first array antenna 161 are disposed, the receive sensitivity of the first antenna ANT_1 may be reduced, and the receive sensitivity of the first array antenna 161 may also be reduced.

Figure 2:
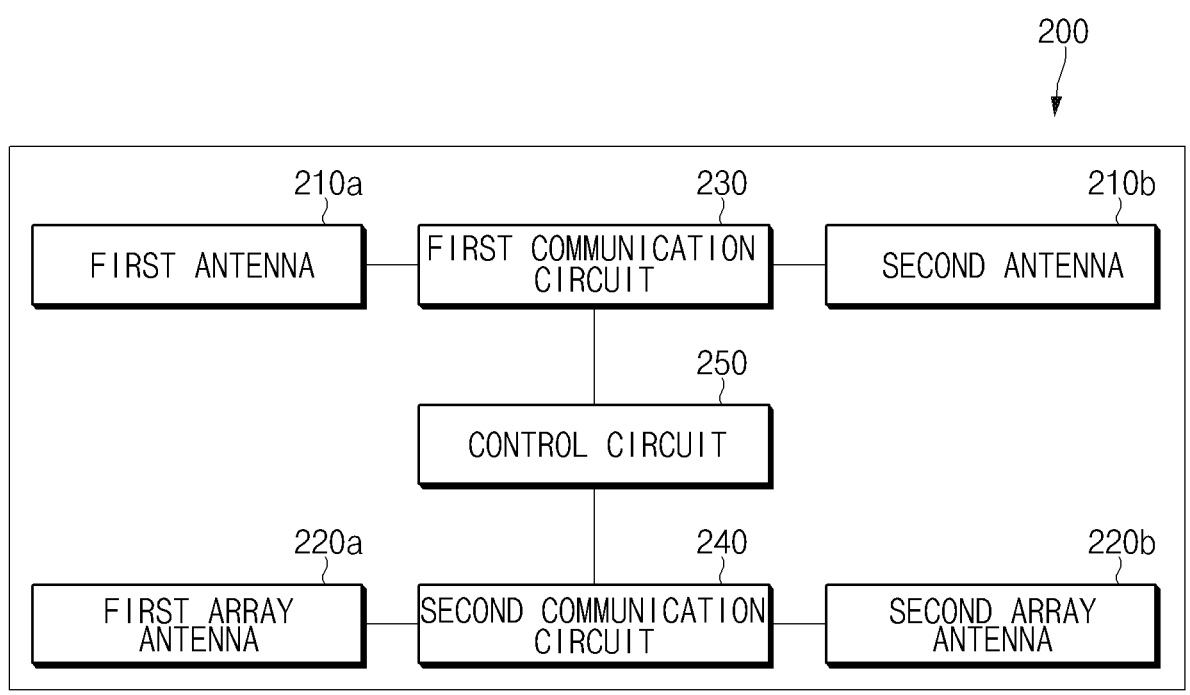
FIG. 2 illustrates a block diagram of an electronic device, according to an embodiment.

FIG. 2 illustrates a block diagram of an electronic device, according to an embodiment.

Referring to FIG. 2, an electronic device 200 (e.g., the electronic device 100 of FIG. 1A) may include a first antenna 210*a*, a second antenna 210*b*, a first array antenna 220*a*, a second array antenna 220*b*, a first communication circuit 230, a second communication circuit 240, and a control circuit 250. According to certain embodiments, the electronic device 200 may further include a component not illustrated in FIG. 2 or may not include a part of the components illustrated in FIG. 2. For example, the electronic device 200 may further include at least one sensor or a memory.

The first antenna 210*a* and the second antenna 210*b* may be antennas for transmitting or receiving a signal in a frequency band of about 6 GHz or lower. For example, the first antenna 210*a* and the second antenna 210*b* may be antennas for LTE communication, Wi-Fi communication, GPS communication, or Bluetooth communication, and possibly performing that portion of 5G mobile communication using a signal in the frequency band of about 6 GHz or lower. In this case, unlike the example illustrated in FIG. 1A, the first antenna 210a and the second antenna 210b may be electrically connected with the second communication circuit 240, not the first communication circuit 230. According to an embodiment, the electronic device 200 may further include at least one or more antennas that are the same as or similar to the first antenna 210a or the second antenna 210b. In this specification, the "antenna" may be distinguished from the "array antenna". For example, the "antenna" may be understood as an antenna for transmitting or receiving a signal in the frequency band of 6 GHz or lower, and the "array antenna" may be understood as an antenna for 5G communication using a signal in a frequency band of about 20 GHz or higher.

According to an embodiment, the first antenna 210a or the second antenna 210b may be disposed on the periphery or proximate to the periphery of the electronic device 200. For example, the first antenna 210a or the second antenna 210b may be implemented by using a conductive region disposed at an edge of the side bezel structure 110 illustrated in FIG. 1A. The conductive region may be divided into a plurality of segmented regions, and the first antenna 210a or the second antenna 210b may be a part of the plurality of segmented regions. For another example, the first antenna 210a or the second antenna 210b may be implemented with an electrical path that comprising a conductive region included in the electronic device 200, for example, a shield can, a conductive connection member, or at least a portion of a printed circuit board.

According to an embodiment, the first antenna 210a and the second antenna 210b may be disposed to be spaced from each other as much as a specified distance. For example, the first antenna 210a may be disposed in a first region, and the second antenna 210b may be disposed in a second region that is spaced from the first region as much as the specified distance. The specified distance may refer to a distance within which mutual interference between a signal that is transmitted or received at the first antenna 210a and a signal that is transmitted or received at the second antenna 210b is lower than a specified acceptable level. For example, the signal that is transmitted or received at the first antenna 210a and the signal that is transmitted or received at the second antenna 210b may be electrically spaced from each other.

The first array antenna 220a and the second array antenna 220b may be antennas for transmitting or receiving a signal in a frequency band ranging from 20 GHz to 100 GHz. For example, the first array antenna 220a and the second array antenna 220b may be antennas for 5G communication. According to an embodiment, the electronic device 200 may further include at least one or more array antennas that are the same as or similar to the first array antenna 220a or the second array antenna 220b.

The first array antenna 220a or the second array antenna 220b may include a plurality of antenna elements. The plurality of antenna elements may be disposed in the form of a specified arrangement, for example, an n×m arrangement. According to an embodiment, the plurality of antenna elements may include dipole antenna elements. According to another embodiment, the plurality of antenna elements may include patch antenna elements. According to an embodiment, antenna elements included in each array antenna may be respectively fed with a power from the second communication circuit 240 and may transmit or receive signals having a specified phase difference mutually. As such, each array antenna may form at least one beam.

According to an embodiment, the first array antenna 220a or the second array antenna 220b may be disposed on the periphery or proximate to the periphery of the electronic device 200. For example, the first array antenna 220a or the second array antenna 220b may be disposed on the periphery of the electronic device 200 so as to be adjacent to the first antenna 210a or the second antenna 210b. For example, the first array antenna 220a may be disposed adjacent to the first antenna 210a, and the second array antenna 220b may be disposed adjacent to the second antenna 210b. According to certain embodiments, in the case where the electronic device 200 includes an additional antenna (e.g., a third antenna) or an additional array antenna (or a third array antenna), the antenna and the array antenna may be disposed adjacent to each other.

According to an embodiment, an antenna array (e.g., a first array (220a)) and an antenna (e.g., the first antenna 210a) that are adjacent to each other are similarly affected by external factors. For example, the first antenna 210a and the first array antenna 220a adjacent to the first antenna 210a may be disposed in a first region, having their electric field characteristics similarly affected by a user grip. In this case, the receive sensitivity of the signal received through the first antenna 210a may be a specified level or lower, and a gain of a beam that the first array antenna 220a forms may be a specified level or lower. As a result, the receive sensitivities of the first array antenna 220a can be used to determine whether a user has gripped the electronic device 200 in an area proximate to the first array antenna 220a. Similarly, if the user has gripped the electronic device 200 in the area proximate to the first array antenna 220a For another example, the second antenna 210b and the second array antenna 220b adjacent to the second antenna 210b may be disposed in a second region, and an electric field situation of the second region may be a specified level or higher, or a user grip may not be made in the second region. In this case, the receive sensitivity of the signal received through the second antenna 210b may be the specified level or higher, and a gain of a beam that the second array antenna 220b forms may be the specified level or higher.

The first communication circuit 230 may be electrically connected with the first antenna 210a and the second antenna 210b. According to an embodiment, the first communication circuit 230 may supply a current of a specified magnitude such that power is selectively provided to the first antenna 210a and/or the second antenna 210b. When a power is provided to the first antenna 210a and/or the second antenna 210b, a signal in a specified frequency band may be transmitted or received based on a specified electrical path.

The second communication circuit 240 may be electrically connected with the first array antenna 220a and the second array antenna 220b. According to an embodiment, the second communication circuit 240 may supply a current of a specified magnitude such that a power is selectively provided to the first array antenna 220a and/or the second array antenna 220b. When a power is provided to the first array antenna 220a and/or the second array antenna 220b, each array antenna may form at least one beam.

According to an embodiment, the second communication circuit 240 may change a direction of the at least one beam based on a control signal. For example, the second communication circuit 240 may change a phase difference of signals applied to respective antenna elements included in any one array antenna, and thus, a direction of at least one beam that the array antenna forms may be changed and controlled.

The control circuit 250 may be electrically connected with the first communication circuit 230 and the second communication circuit 240. According to an embodiment, the control circuit 250 may control operations of any other components included in the electronic device 200 or may perform an operation on electrical signals from the components. The control circuit 250 may include, for example, any one of an application processor (AP), a communication processor (CP), or a baseband processor (BP).

According to an embodiment, the control circuit 250 may control the first communication circuit 230 such that a signal in a specified frequency band is transmitted or received by using the first antenna 210a or the second antenna 210b. In an embodiment, the control circuit 250 may obtain the receive sensitivity of the first antenna 210a or the second antenna 210b by using the first communication circuit 230. For example, the control circuit 250 may identify the receive sensitivity based on at least one of a reference signals received power (RSRP), a reference signal received quality (RSRQ), a received signal strength index (RSSI), and a signal noise ratio (SNR).

In an embodiment, the control circuit 250 may identify whether the receive sensitivity of each antenna receiving a signal is lower than a specified level or is the specified level or higher. According to an embodiment, based on the receive sensitivity of each antenna receiving a signal, the control circuit 250 may estimate the likelihood of a user grip affecting the electric field of the associated array antenna 220. The control circuit 250 may perform a specified operation based on the estimated electric field or the estimated result indicating whether a user grip is made.

According to an embodiment, the control circuit 250 may control the second communication circuit 240 such that a signal in a specified frequency band is transmitted or received by using the first array antenna 220a or the second array antenna 220b. According to an embodiment, the control circuit 250 may control the second communication circuit 240 such that the first array antenna 220a or the second array antenna 220b is activated or deactivated. For example, the control circuit 250 may activate both the first array antenna 220a and the second array antenna 220b, or may activate only one of the first array antenna 220a and the second array antenna 220b.

In certain embodiments, the control circuit 250 may activate or deactivate the first array antenna 220a or the second array antenna 220b based at least on a situation of a region where the first array antenna 220a is disposed or a situation where the second array antenna 220b is disposed, for example, an electric field situation or whether a user grip is made. According to an embodiment, the control circuit 250 may allow the second communication circuit 240 to form at least one beam for transmitting or receiving a signal in a specified frequency band by using the activated array antenna. According to an embodiment, the control circuit 250 may track a beam of a signal transmitted from any other electronic device, for example, a base station by using the at least one beam thus formed. The control circuit 250 may search for an optimum beam for communicating with the base station. For example, the control circuit 250 may search for an array antenna for forming the optimum beam or may search for a direction of the optimum beam.

According to certain embodiments, the electronic device 200 may further include at least one sensor. In certain embodiments, the at least one sensor may be electrically connected with the control circuit 250 and may transmit a sensed result to the control circuit 250. In an embodiment, the control circuit 250 may activate or deactivate the first array antenna 220a or the second array antenna 220b based at least on the result sensed by the at least one sensor. For example, the at least one sensor may identify whether a user grip is made in each region of the electronic device 200, and the control circuit 250 may activate the first array antenna 220a or the second array antenna 220b based at least on the identification. According to certain embodiments, the at least one sensor may include at least one of an image sensor, a proximity sensor, a fingerprint sensor, or a heart rate monitor (HRM) sensor.

According to an embodiment, the electronic device 200 may further include a memory electrically connected with the control circuit 250. According to an embodiment, the memory may store information about receive sensitivities of the first antenna 210a and the second antenna 210b, which corresponds to user grip types, respectively. For example, the user grip types may be stored in the form of an n-phase quadrature-phase (IQ) value. For example, the electronic device 200 at initialization can stored the foregoing information based on known user grip states. In an embodiment, the control circuit 250 may detect a region of the electronic device 200, in which a user grip is made, based at least on the information stored in the memory. The electronic device 200 can later use detected n-phase quadrature-phase (IQ) values to determine whether the electronic device 200 is gripped by a user. The control circuit 250 may activate or deactivate the first array antenna 220a or the second array antenna 220b based at least on the detected region.

Figure 3:
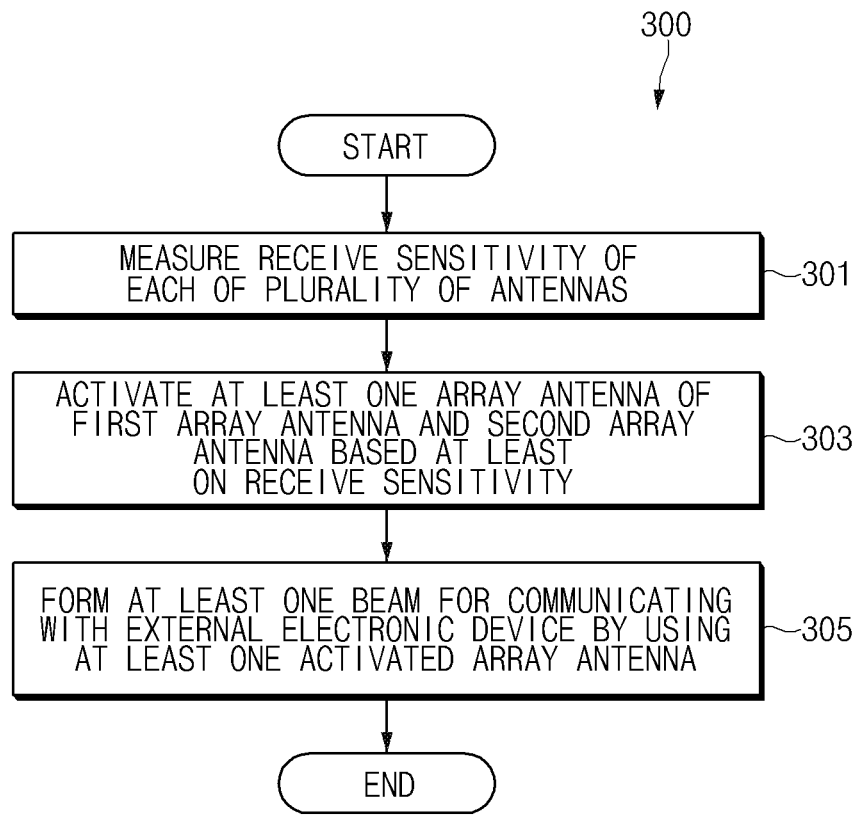
FIG. 3 is a flowchart illustrating a method in which an electronic device searches for an optimum beam for performing 5G communication by using a receive sensitivity of an antenna.

FIG. 3 is a flowchart illustrating a method in which an electronic device searches for an optimum beam for performing 5G communication by using a receive sensitivity of an antenna.

Referring to FIG. 3, a method of searching for an optimum beam for performing 5G communication may include operation 301 to operation 305. According to an embodiment, it may be understood that operation 301 to operation 305 are performed by the electronic device 200 or the control circuit 250 illustrated in FIG. 2.

In operation 301, an electronic device may measure a receive sensitivity of each of a plurality of antennas. For example, the electronic device may measure the receive sensitivity of each of the first antenna 210a and the second antenna 210b. The receive sensitivity may be quantified by using the RSRP, RSRQ, RSSI, or SNR.

In operation 303, the electronic device may activate at least one array antenna of the first array antenna 220a and the second array antenna 220b illustrated in FIG. 2, based at least on the receive sensitivity measured in operation 301. According to an embodiment, based at least on the receive sensitivity measured in operation 301, the electronic device may determine the likelihood of a user grip proximate to each region of the electronic device 200.

For example, a receive sensitivity of a first antenna from among a first antenna and a second antenna illustrated in FIG. 2 may be a specified level or higher, and a receive sensitivity of the second antenna may be lower than the specified level. In this case, the electronic device may identify that a user grip is made in a region where the second antenna is disposed, for example, a second region or that an electric field is lower than a specified level due to any other obstacle. In contrast, the electronic device may identify that a user grip is not made in a region where the first antenna is disposed and an electric field situation is good. The electronic device may activate a first array antenna disposed adjacent to the first region and may deactivate a second array antenna disposed adjacent to the second region.

For another example, the receive sensitivities of both the first antenna and the second antenna illustrated in FIG. 2 may be lower than the specified level. In this case, the electronic device may identify that the electric field of the first region and the second region are lower than the specified level or that a user grip is made. The electronic device activates both the first array antenna and the second array antenna for the purpose of increasing a gain of a formed beam.

In operation 305, the electronic device may form at least one beam for communicating with an external electronic device by using the at least one array antenna activated in operation 303. For example, the electronic device may form a plurality of beams by using a plurality of array antennas or may form at least one beam by using any one array antenna.

According to an embodiment, the electronic device may track a beam formed by the external electronic device by using the at least one beam thus formed. For example, the electronic device may search for a direction of a beam that is matched with the beam formed by the external electronic device while changing a direction of the at least one beam thus formed. In an embodiment, the electronic device may determine a condition for an optimum beam that is matched with the beam formed by the external electronic device. For example, the electronic device may find conditions, which are associated whether to use any array antenna and whether to form a beam in any direction for the purpose of forming the optimum beam.

The electronic device may efficiently search for (or determine) an optimum beam for communicating with the external electronic device through operation 301 to operation 305 and may communicate with the external electronic device by using the optimum beam. For example, an array antenna where an electric field situation is not good or of which a disposed location is gripped by a user may be excluded from the process of searching for the optimum beam, and thus, the electronic device may have advantageous effects in terms of a time and power efficiency.

Figure 4:
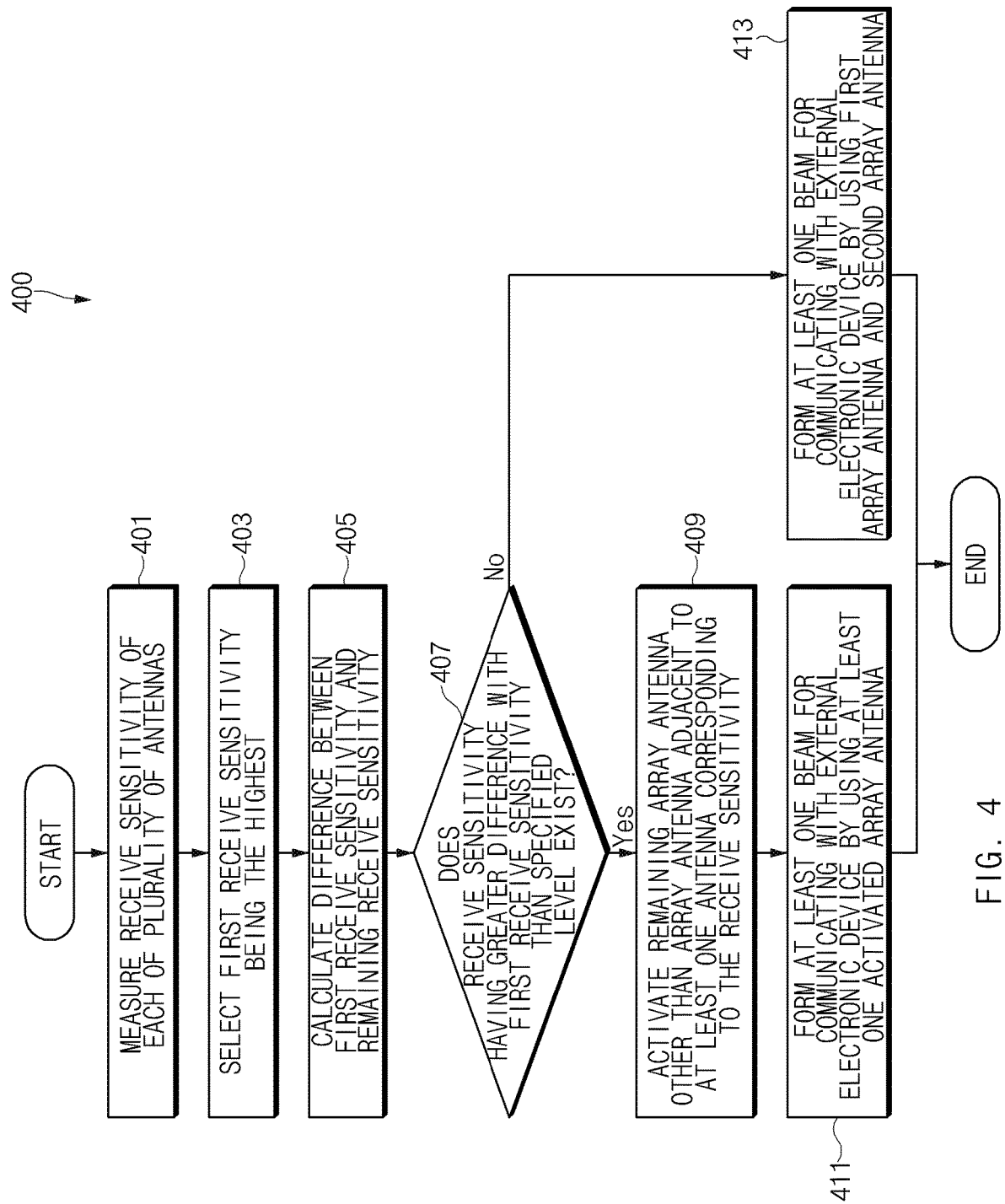
FIG. 4 is a flowchart illustrating a method in which an electronic device searches for an optimum beam for performing 5G communication by using a receive sensitivity of an antenna, according to another embodiment.

FIG. 4 is a flowchart illustrating a method in which an electronic device searches for an optimum beam for performing 5G communication by using a receive sensitivity of an antenna, according to another embodiment.

Referring to FIG. 4, a method of searching for an optimum beam for performing 5G communication may include operation 401 to operation 413. According to an embodiment, it may be understood that operation 401 to operation 413 are performed by the electronic device 200 or the control circuit 250 illustrated in FIG. 2. In FIG. 4, with regard to the description given with reference to FIG. 3, additional description will be omitted to avoid redundancy.

In operation 401, an electronic device may measure a receive sensitivity of each of a plurality of antennas. For example, the electronic device may measure receive sensitivities of the first antenna 210a and the second antenna 210b, respectively. The receive sensitivities may be quantified by using the RSRP, RSRQ, RSSI, or SNR.

In operation 403, the electronic device may select a first receive sensitivity being the highest from among the receive sensitivities measured in operation 401. For example, a receive sensitivity being the highest from among receive sensitivities of a first antenna and a second antenna may selected as the first receive sensitivity.

In operation 405, the electronic device may calculate a difference between the first receive sensitivity and the remaining receive sensitivity. For example, when the receive sensitivity of the first antenna is selected as the first receive sensitivity, a difference between the first receive sensitivity and the receive sensitivity of the second antenna may be calculated. In certain embodiments, in the case where the electronic device further include a third antenna or a fourth antenna, the electronic device may calculate a difference between the first receive sensitivity and a receive sensitivity of the third antenna or a difference between the first receive sensitivity and a receive sensitivity of the fourth antenna, respectively.

In operation 407, the electronic device may identify whether there is a receive sensitivity having a greater difference with the first receive sensitivity than a specified level, based on a result calculated in operation 405. For example, the electronic device may identify whether there is an antenna having a receive sensitivity lower than the first receive sensitivity as much as the specified level or greater. In an embodiment, when there is an antenna having a receive sensitivity lower than the first receive sensitivity as much as the specified level or greater, the electronic device may perform operation 409; if not, the electronic device may perform operation 413.

In operation 409, the electronic device may activate the remaining array antenna other than an array antenna adjacent to at least one antenna corresponding to a receive sensitivity having a difference greater than the specified level. When the at least one antenna corresponding to the receive sensitivity having the difference greater than the specified level exists, a region where the at least one antenna is disposed may be a region where an electric field situation is a specified level or lower or a user grip is made.

According to an embodiment, because the electronic device includes an array antenna disposed adjacent to each antenna, the electronic device may include at least one array antenna disposed in the region where the at least one antenna is disposed. According to an embodiment, because a communication environment of the region where the at least one antenna is disposed is able to be a specified level or lower, the electronic device may deactivate the at least one array antenna and may activate the remaining array antenna other than the deactivated array antenna.

In operation 411, the electronic device may form at least one beam for communicating with an external electronic device by using the at least one array antenna activated in operation 409. According to an embodiment, operation 411 may be the same as or similar to operation 305 of FIG. 3. The electronic device may track a beam formed by the external electronic device by using the at least one beam thus formed. For example, the electronic device may search for an optimum beam that is matched with the beam formed by the external electronic device.

Alternatively, in operation 407, the electronic device may identify which ones of the plurality of antennas have a receive sensitivity that is within a specified level of the highest receive sensitivity, and in operation 409 activate at least one array antenna that is adjacent to an antenna having the receive sensitivity that is within the specified level of the highest receive sensitivity to form the beam in operation 411.

In operation 413, the electronic device may form at least one beam for communicating with the external electronic device by using a first array antenna and a second array antenna. According to an embodiment, it may be understood that a plurality of antennas included in the electronic device have receive sensitivities of a given level when there is no receive sensitivity having a greater difference with the first receive sensitivity than the specified level or greater. For example, the receive sensitivities of the plurality of antennas may be the specified level or higher or may be lower than the specified level. In this case, the electronic device may activate all the array antennas and may form at least one beam by using the activated array antennas. The electronic device may track a beam formed by the external electronic device by using the at least one beam thus formed. For example, the electronic device may search for an optimum beam that is matched with the beam formed by the external electronic device.

The electronic device may efficiently determine an optimum beam for communicating with the external electronic device through operation 401 to operation 413 and may communicate with the external electronic device by using the optimum beam. For example, an array antenna where an electric field situation is not good or of which a disposed location is gripped by the user may be excluded from the process of searching for the optimum beam, and thus, the electronic device may have advantageous effects in terms of a time and power efficiency.

Figure 5:
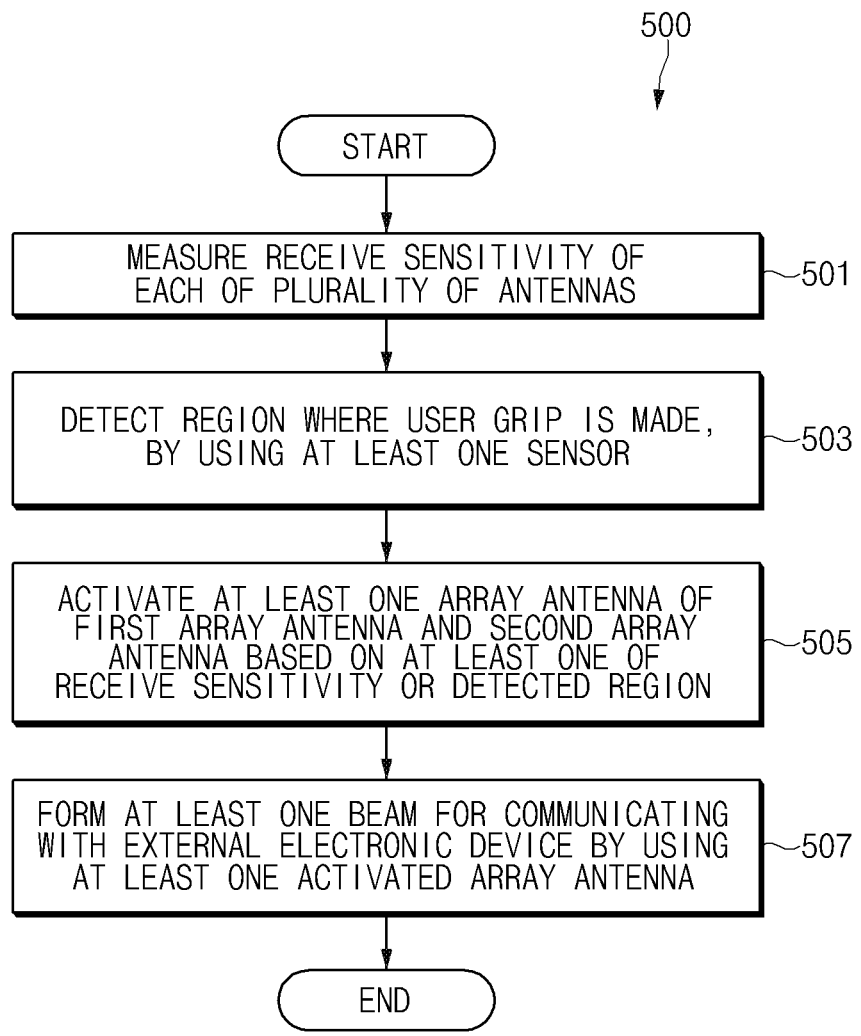
FIG. 5 is a flowchart illustrating a method in which an electronic device searches for an optimum beam for performing 5G communication by using a receive sensitivity of an antenna and a user-gripped region.

FIG. 5 is a flowchart illustrating a method in which an electronic device searches for an optimum beam for performing 5G communication by using a receive sensitivity of an antenna and a user-gripped region.

Referring to FIG. 5, a method of searching for an optimum beam for performing 5G communication may include operation 501 to operation 507. According to an embodiment, it may be understood that operation 501 to operation 507 are performed by the electronic device 200 or the control circuit 250 illustrated in FIG. 2. In FIG. 5, with regard to the description given with reference to FIG. 3, additional description will be omitted to avoid redundancy. For example, operation 501, operation 505, and operation 507 may be the same as or similar to operation 301, operation 303, and operation 305 of FIG. 3, respectively.

In operation 501, an electronic device may measure a receive sensitivity of each of a plurality of antennas. For example, the electronic device may measure the receive sensitivity of each of the first antenna 210a and the second antenna 210b.

In operation 503, the electronic device may detect a region where a user grip is made, by using at least one sensor. For example, the electronic device may identify whether a user grip is made in a surrounding region of an image sensor, a proximity sensor, or a fingerprint sensor disposed on a front surface thereof, by using the image sensor, the proximity sensor, or the fingerprint sensor. For another example, the electronic device may identify whether a user grip is made in a surrounding region of the image sensor, an HRM sensor, or the fingerprint sensor disposed on the front surface thereof, by using the image sensor, the HRM sensor, or the fingerprint sensor. A receive sensitivity of an array antenna disposed in the region where the user grip is made may markedly decrease due to the strong straightness of a millimeter wave signal. Accordingly, the electronic device may improve power efficiency by deactivating an array antenna disposed in a region where a user grip is made.

In operation 505, the electronic device may activate at least one array antenna of the first array antenna 220a and the second array antenna 220b illustrated in FIG. 2, based at least on at least one of the measured receive sensitivity or the detected region. According to an embodiment, based at least on at least one of the measured receive sensitivity or the detected region, the electronic device may identify an electric field or whether a user grip is made, with respect to each region of the electronic device. The electronic device may activate or deactivate at least one array antenna depending on the electric field or whether the user grip is made, which is identified with respect to each region of the electronic device. In certain embodiments, the electronic device may activate each array antenna other than an array antenna adjacent to an antenna that is proximate to the region gripped by the user.

In operation 507, the electronic device may form at least one beam for communicating with an external electronic device by using the at least one array antenna thus activated. According to an embodiment, the electronic device may track a beam formed by the external electronic device by using the at least one beam thus formed. In an embodiment, the electronic device may determine a condition for an optimum beam that is matched with the beam formed by the external electronic device. For example, the electronic device may find conditions, which are associated with whether to use any array antenna and whether to form a beam in any direction for the purpose of forming the optimum beam.

According to an embodiment, the electronic device may form at least one beam in operation 507, and may identify an electric field situation or whether a user grip is made, with respect to each region of the electronic device at a specified time interval while communicating with the external electronic device. For example, the electronic device may perform operation 501 to operation 503 at the same time with performing operation 507. In an embodiment, in the case where an electric field situation or a user grip (or a user-gripped location) associated with each region of the electronic device changes, the electronic device may deactivate the activated at least one array antenna based on the change or may activate a new array antenna. In other words, the electronic device may switch an array antenna to be activated, based on at least one of an electric field situation or whether a user grip is made.

The electronic device may efficiently determine an optimum beam for communicating with the external electronic device through operation 501 to operation 507 and may communicate with the external electronic device by using the optimum beam. For example, the electronic device may effectively exclude an array antenna disposed in a region where a user grip is made, in the process of searching for an optimum beam.

Figure 6A:
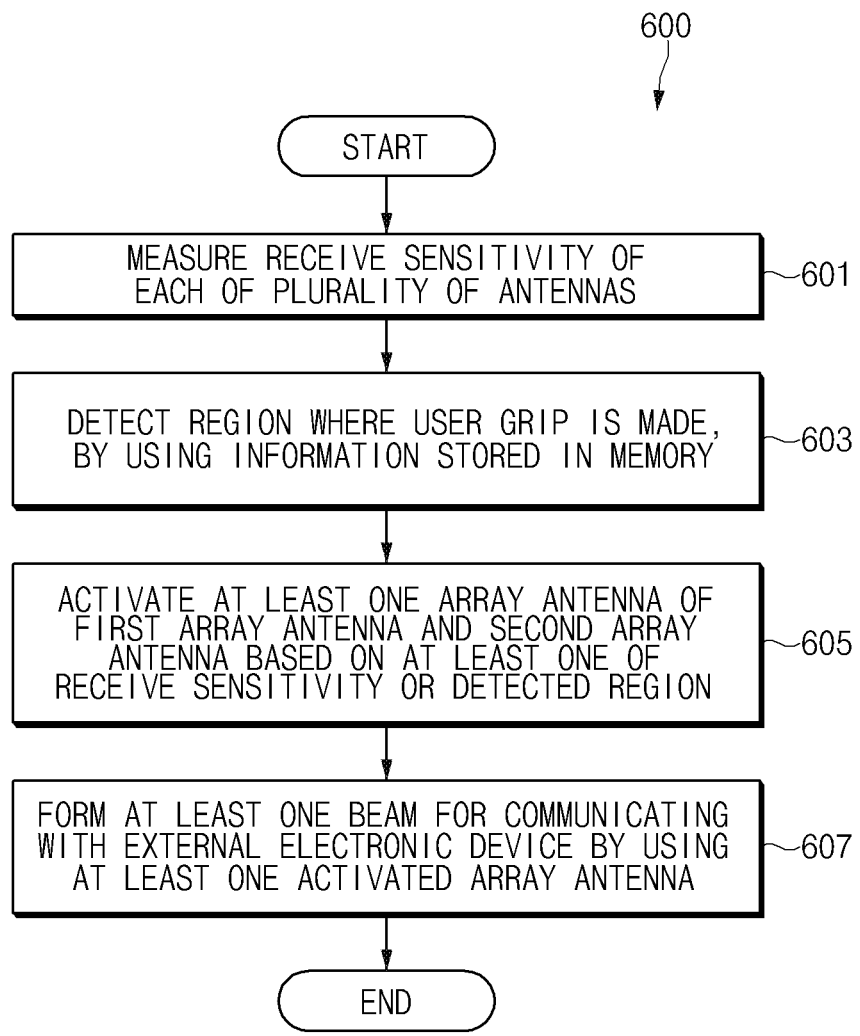
FIG. 6A is a flowchart illustrating a method in which an electronic device searches for an optimum beam for performing 5G communication by using a receive sensitivity of an antenna and a user-gripped region.

FIG. 6A is a flowchart illustrating a method in which an electronic device searches for an optimum beam for performing 5G communication by using a receive sensitivity of an antenna and a user-gripped region.

Referring to FIG. 6A, a method of searching for an optimum beam for performing 5G communication may include operation 601 to operation 607. According to an embodiment, it may be understood that operation 601 to operation 607 are performed by the electronic device 200 or the control circuit 250 illustrated in FIG. 2. In FIG. 6A, with regard to the description given with reference to FIG. 3, additional description will be omitted to avoid redundancy. For example, operation 601, operation 605, and operation 607 may be the same as or similar to operation 301, operation 303, and operation 305 of FIG. 3, respectively.

In operation 601, an electronic device may measure a receive sensitivity of each of a plurality of antennas. For example, the electronic device may measure the receive sensitivity of each of the first antenna 210a and the second antenna 210b.

In operation 603, the electronic device may detect a region where a user grip is made, by using information stored in a memory. According to an embodiment, the electronic device may classify user grip types based on receive sensitivity distributions of the plurality of antennas and may store a result of the classification in the memory after being put into a database. For example, the electronic device may in advance put, into a database, a receive sensitivity distribution of a plurality of antennas when the user grips the electronic device only with his/her right hand or a receive sensitivity distribution of the plurality of antennas when the user grips the electronic device with his/her two hands, so as to be stored in the memory. The electronic device may compare the receive sensitivity of each antenna measured in operation 601 with types of a plurality of receive sensitivity distributions stored in the memory, and thus, the electronic device may analogize a user grip type corresponding to a current receive sensitivity distribution. According to an embodiment, a receive sensitivity of an array antenna disposed in a region where the user grip is made may markedly decrease due to the strong straightness of a millimeter wave signal. Accordingly, the electronic device may improve power efficiency by deactivating the array antenna disposed in the region where the user grip is made.

In operation 605, the electronic device may activate at least one array antenna of the first array antenna 220a and the second array antenna 220b illustrated in FIG. 2, based on at least one of the measured receive sensitivity or the detected region. According to an embodiment, based on at least one of the measured receive sensitivity or the detected region, the electronic device may identify an electric field situation or whether a user grip is made, with respect to each region of the electronic device. The electronic device may activate or deactivate at least one array antenna depending on the electric field or whether the user grip is made, which is identified with respect to each region of the electronic device. In certain embodiments, the electronic device may activate each array antenna other than an array antenna adjacent to an antenna that is proximate to the region gripped by the user.

In operation 607, the electronic device may form at least one beam for communicating with an external electronic device by using the at least one array antenna activated in operation 605. According to an embodiment, the electronic device may track a beam formed by the external electronic device by using the at least one beam thus formed. In an embodiment, the electronic device may determine a condition for an optimum beam that is matched with the beam formed by the external electronic device. For example, the electronic device may find conditions, which are associated with whether to use any array antenna and whether to form a beam in any direction for the purpose of forming the optimum beam.

According to an embodiment, the electronic device may form at least one beam in operation 607, and may identify an electric field situation or whether a user grip is made, with respect to each region of the electronic device at a specified time interval while communicating with the external electronic device. For example, the electronic device may perform operation 601 to operation 605 at the same time with performing operation 607. In an embodiment, in the case where an electric field situation or a user grip (or a user-gripped location) associated with each region of the electronic device changes, the electronic device may deactivate the at least one activated array antenna based on the change or may activate a new array antenna. In other words, the electronic device may switch an array antenna to be activated, based on at least one of an electric field situation or whether a user grip is made.

The electronic device may efficiently determine an optimum beam for communicating with the external electronic device through operation 601 to operation 609 and may communicate with the external electronic device by using the optimum beam. For example, the electronic device may effectively exclude an array antenna disposed in a region where a user grip is made, in the process of searching for an optimum beam.

Figure 6B:
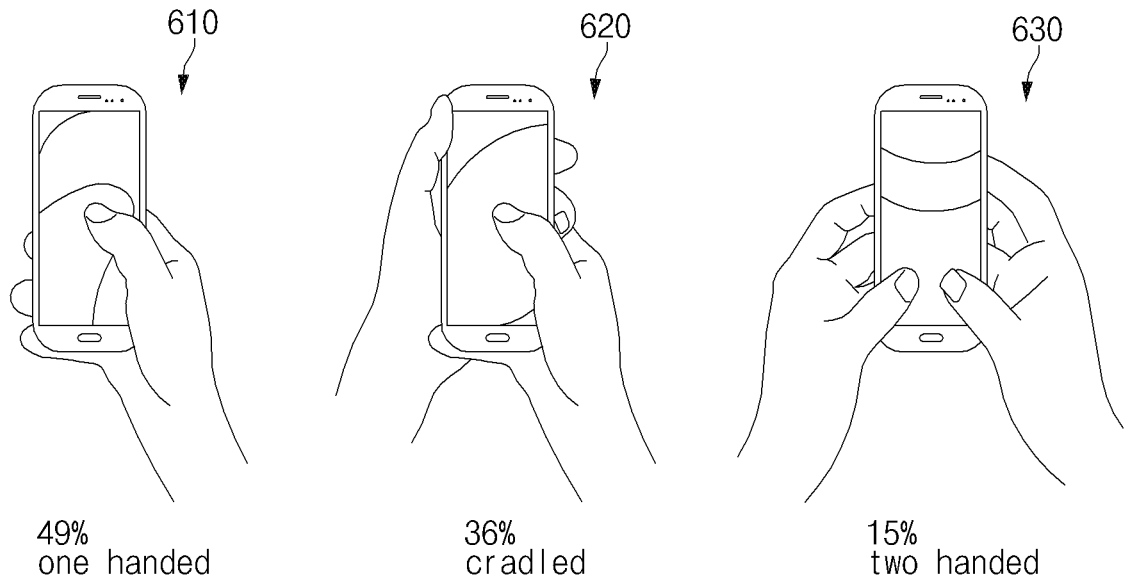
FIG. 6B illustrates a method of searching for an optimum beam for performing 5G communication by using a grip pattern of a user, according to an embodiment.

FIG. 6B illustrates a method of searching for an optimum beam for performing 5G communication by using a grip pattern of a user, according to an embodiment.

Referring to FIG. 6B, an in-phase quadrature-phase (IQ) table 640 showing a relationship between various grip types associated with an electronic device (e.g., the electronic device 200 of FIG. 2) and user-gripped regions where array antennas are disposed is illustrated. The condition column indicates which regions (or antennas corresponding thereto) are gripped by the user. According to certain embodiments, a first grip type 610 may be understood as a type in which an electronic device is gripped with one hand, a second grip type 620 may be understood as a type in which the electronic device is gripped with one hand while being supported by the other hand, and a third grip type 630 may be understood as a type in which the electronic device is gripped with both bands. According to an embodiment, there may be various user grip types, and antenna impedances of a plurality of antennas may change depending on the user grip types. In an embodiment, the antenna impedances may be converted in the form of IQ coordinates.

According to an embodiment, an antenna impedance may change depending on a user grip type, and the electronic device may compare the antenna impedance with the IQ table 640 stored in the memory. FIG. 6B shows the IQ table 640 indicating antenna impedances of a plurality of antennas. However, according to other embodiments, an IQ table may indicate an antenna impedance of one array antenna. In this case, the electronic device may compare antenna impedances of antenna arrays indicated by a plurality of IQ tables. The electronic device may analogize whether a current user grip type is any type, based on the comparison. For example, as illustrated in FIG. 6B, with regard to a current user grip type, the electronic device may identify a percentage of the first grip type 610 as 49%, may identify a percentage of the second grip type 620 as 36%, and may identify a percentage of the third grip type 630 as 15%. In this case, the electronic device may identify that the user grips the electronic device in the first grip type 610.

According to an embodiment, the electronic device may deactivate at least one array antenna based on a user grip type. For example, when a user grip type corresponds to the first grip type 610, as illustrated in the IQ table 640, the electronic device may identify that a region of a first array antenna is gripped and may deactivate the first array antenna. For example, when the user grip type corresponds to the third grip type 630, as illustrated in the IQ table 640, the electronic device may identify that a region of a second array antenna is gripped and may deactivate the second array antenna. The electronic device may perform operation 605 to operation 607 illustrated in FIG. 6A through the above process.

Accordingly, the row of a grip condition that is most similar to the actual I and Q coordinates indicates which regions, e.g., regions 191, 192, 193, and 194 is gripped.

Figure 7A:
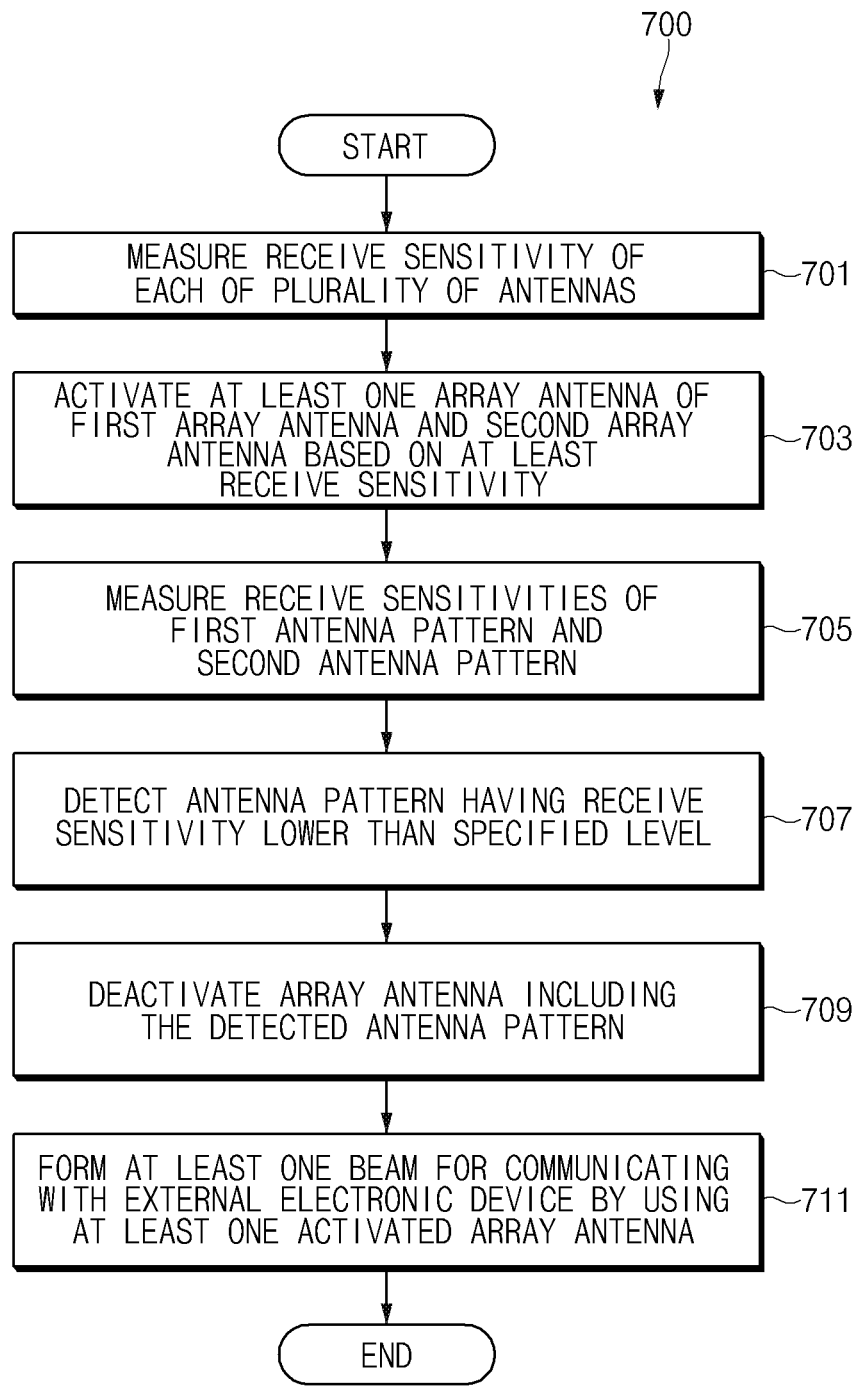
FIG. 7A is a flowchart illustrating a method in which an electronic device searches for an optimum beam for performing 5G communication by using a receive sensitivity of an antenna pattern.

FIG. 7A is a flowchart illustrating a method in which an electronic device searches for an optimum beam for performing 5G communication by using a receive sensitivity of an antenna pattern.

Referring to FIG. 7A, a method of searching for an optimum beam for performing 5G communication may include operation 701 to operation 711. According to an embodiment, it may be understood that operation 701 to operation 711 are performed by the electronic device 200 or the control circuit 250 illustrated in FIG. 2. In FIG. 7A, with regard to the description given with reference to FIG. 3, additional description will be omitted to avoid redundancy. For example, operation 701, operation 703, and operation 711 may be the same as or similar to operation 301, operation 303, and operation 305 of FIG. 3, respectively.

In operation 701, an electronic device may measure a receive sensitivity of each of a plurality of antennas. For example, the electronic device may measure the receive sensitivity of each of the first antenna 210a and the second antenna 210b.

In operation 703, the electronic device may activate at least one array antenna of the first array antenna 220a and the second array antenna 220b illustrated in FIG. 2, based at least on the measured receive sensitivity. According to an embodiment, based at least on the receive sensitivity measured in operation 701, the electronic device may identify an electric field situation or whether a user grip is made, with respect to each region of the electronic device. The electronic device may activate or deactivate at least one array antenna depending on the electric field situation or whether the user grip is made, which is identified with respect to each region of the electronic device.

In operation 705, the electronic device may measure a receive sensitivity of each of a first antenna pattern and a second antenna pattern. According to an embodiment, each array antenna may include an antenna pattern disposed in at least a partial region thereof. For example, the first array antenna may include a first antenna pattern, and the second array antenna may include a second antenna pattern. The antenna pattern may operate as an antenna that is able to receive a signal in a frequency band of 6 GHz or lower, for example. Through the antenna pattern, the electronic device may more accurately identify an electric field situation or whether a user grip is made, with respect to a region where an array antenna is disposed.

In operation 707, the electronic device may detect an antenna pattern having a receive sensitivity lower than a specified level. According to an embodiment, the electronic device may detect a region where an electric field situation is a specified level or lower or a region where a user grip is made, based on the receive sensitivity measured in operation 705. The electronic device may identify a region, in which there is disposed an antenna pattern having a receive sensitivity lower than the specified level, as a region where an electric field situation is a specified level or lower or a user grip is made.

In operation 709, the electronic device may deactivate an array antenna including the antenna pattern detected in operation 707. The array antenna including the detected antenna pattern may cause a significant decrease in a receive sensitivity of a millimeter wave signal. Accordingly, the electronic device may improve power efficiency by deactivating the array antenna disposed in the region where the user grip is made. However, when an antenna pattern having a receive sensitivity lower than the specified level is not detected in operation 705, the electronic device may not deactivate any one array antenna.

According to an embodiment, operation 701 to operation 703 and operation 705 to operation 709 may be performed in parallel, or may be performed in reverse. For example, the electronic device may activate or deactivate at least one array antenna based on a receive sensitivity of an antenna and a receive sensitivity of an antenna pattern. For another example, the electronic device may deactivate at least one array antenna based on a receive sensitivity of an antenna pattern and may then activate at least one array antenna based on a receive sensitivity of an antenna.

In operation 711, the electronic device may form at least one beam for communicating with an external electronic device by using the at least one array antenna activated through operation 703 and operation 709. According to an embodiment, the electronic device may track a beam formed by the external electronic device by using the at least one beam thus formed. In an embodiment, the electronic device may determine a condition for an optimum beam that is matched with the beam formed by the external electronic device. For example, the electronic device may find conditions associated with any array antenna for forming a beam and any direction of the beam, for the purpose of forming the optimum beam.

According to an embodiment, the electronic device may form at least one beam in operation 711, and may identify an electric field situation or whether a user grip is made, with respect to each region of the electronic device at a specified time interval while communicating with the external electronic device. For example, the electronic device may perform operation 701 to operation 703 or operation 705 to operation 709 at the same time with performing operation 711. In an embodiment, in the case where an electric field situation or a user grip (or a user-gripped location) associated with each region of the electronic device changes, the electronic device may form at least one beam by using an array antenna different from the at least one array antenna.

The electronic device may efficiently determine an optimum beam for communicating with an external electronic device through operation 701 to operation 711 and may communicate with the external electronic device by using the optimum beam. For example, the electronic device may effectively exclude an array antenna disposed in a region where an electric field situation is a specified level or lower or a user grip is made, in the process of searching for an optimum beam.

Figure 7B:
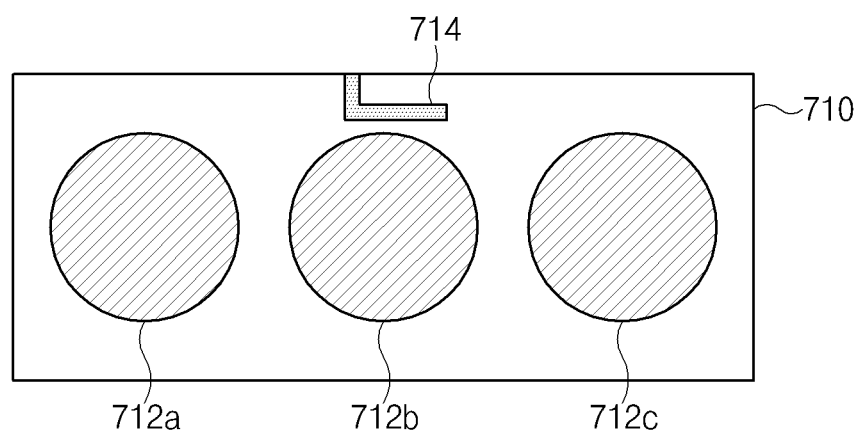
FIG. 7B illustrates an antenna module including an antenna pattern, according to an embodiment.

FIG. 7B illustrates an antenna module including an antenna pattern, according to an embodiment.

Referring to FIG. 7B, an antenna module 710 (e.g., the first array antenna 220a or the second array antenna 220b of FIG. 2) may include a plurality of antenna elements 712a, 712b, and 712c, and an antenna pattern 714. According to certain embodiments, a shape of the antenna module 710 is not limited to the example illustrated in FIG. 7B. For example, a shape or the number of the plurality of antenna elements 712a, 712b, and 712c included in the antenna module 710 may be different from the example illustrated in FIG. 7B, and a shape or a length of the antenna pattern 714 may be different from the example illustrated in FIG. 7B. In addition, one antenna pattern 714 is illustrated in FIG. 7B, but the number of antenna modules 710 is not limited to the example illustrated in FIG. 7B.

According to an embodiment, the plurality of antenna elements 712a, 712b, and 712c may be fed with a power from a communication circuit (e.g., the second communication circuit 240 of FIG. 2), and may transmit or receive millimeter wave signals having different phase differences. As such, the antenna module 710 may form at least one beam.

According to an embodiment, the antenna pattern 714 may be a conductive pattern formed in a non-conductive region of the antenna pattern 714. According to an embodiment, an electronic device may receive a signal in a frequency band of 6 GHz or lower by using the antenna pattern 714. The electronic device may measure a sensitivity of the received signal; based on the measured sensitivity, the electronic device may identify an electric field situation or whether a user grip is made, with respect to a region where the antenna module 710 is disposed. For example, when a receive sensitivity of an antenna patch is lower than a specified level, the electronic device may identify that an electric field situation of a region where the antenna module 710 is disposed is a specified level or lower or that a user grip is made in the region. For another example, when the receive sensitivity of the antenna patch is the specified level or higher, the electronic device may identify that the electric field situation of the region where the antenna module 710 is disposed is the specified level or higher or that a user grip is not made in the region.

The electronic device may activate or deactivate the antenna module 710 based on the identification. For example, when the receive sensitivity of the antenna patch is the specified level or higher, the electronic device may activate the antenna module 710; when the receive sensitivity of the antenna patch is lower than the specified level, the electronic device may deactivate the antenna module 710. The electronic device may perform operation 705 to operation 709 illustrated in FIG. 7A through the above process.

An electronic device (e.g., the electronic device 100 of FIG. 1) according to certain embodiments may further include various components in addition to the components described with reference to FIGS. 1 to 7B. For example, the electronic device may further include at least one of components of an electronic device 801 to be described with reference to FIG. 8.

Figure 8:
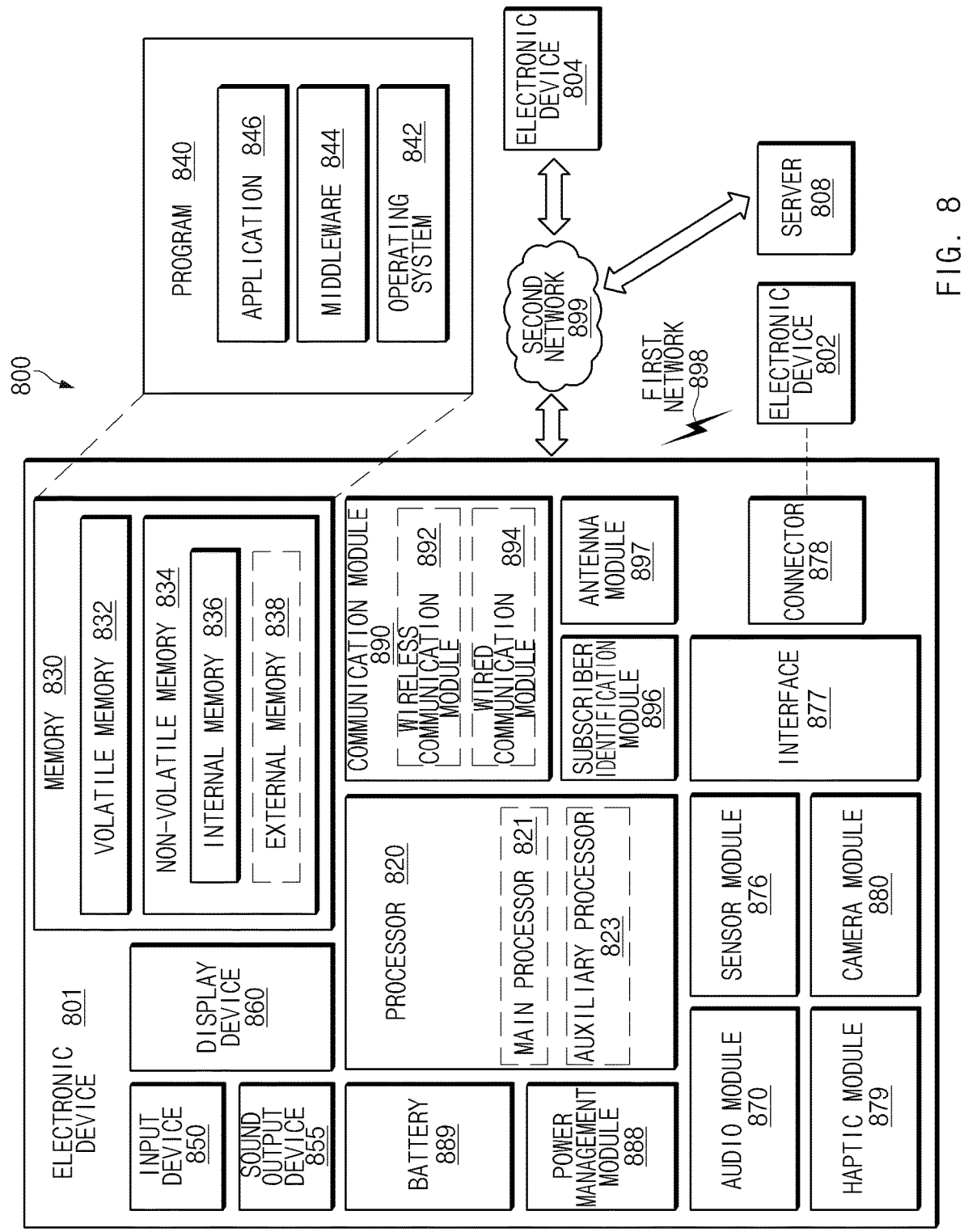
FIG. 8 is a block diagram of an electronic device in a network environment, according to certain embodiments.

FIG. 8 is a block diagram illustrating an electronic device 801 in a network environment 800 according to certain embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

According to an embodiment of the disclosure, a time taken for an electronic device to search for an optimum beam for communicating with any other electronic device or a base station may decrease. Also, current consumption of the electronic device may decrease. The electronic device may provide an improved communication performance and an extended battery lifespan.

As described above, an electronic device may include a plurality of antennas spaced from each other, a first communication circuit that is electrically connected with the plurality of antennas, a first array antenna that is disposed adjacent to at least one of the plurality of antennas, a second array antenna that is disposed adjacent to another antenna different from the at least one antenna from among the plurality of antennas, a second communication circuit that is electrically connected with the first array antenna and the second array antenna, and at least one control circuit that is electrically connected with the first communication circuit and the second communication circuit. The at least one control circuit may obtain receive sensitivities of the plurality of antennas through the first communication circuit, may activate at least one array antenna of the first array antenna and the second array antenna through the second communication circuit based at least on the receive sensitivities, and may form at least one beam for communicating with an external electronic device, by using the activated at least one array antenna.

According to an embodiment, the at least one control circuit may calculate a difference between a first receive sensitivity being the highest and each of remaining receive sensitivities based at least on the obtained receive sensitivities, and may activate a remaining array antenna of the first array antenna and the second array antenna other than an array antenna adjacent to at least one antenna corresponding to a receive sensitivity of the at least one array antenna by using the second communication circuit when at least one receive sensitivity having a greater difference with the calculated first receive sensitivity than a specified level exists.

According to an embodiment, the at least one control circuit may activate both the first array antenna and the second array antenna by using the second communication circuit when the at least one receive sensitivity having the greater difference with the calculated first receive sensitivity than the specified level does not exist.

According to an embodiment, the at least one control circuit may deactivate a remaining array antenna of the first array antenna and the second array antenna other than the activated at least one array antenna by using the second communication circuit.

According to an embodiment, the at least one control circuit may identify the receive sensitivities based on at least one of a reference signals received power (RSRP), a reference signal received quality (RSRQ), a received signal strength index (RSSI), and a signal noise ratio (SNR).

According to an embodiment, the electronic device may further include at least one sensor, and the at least one control circuit may detect a region of the electronic device, in which a user grip is made, by using the at least one sensor and may control the second communication circuit based at least on the detected region such that at least one of the first array antenna and the second array antenna is deactivated.

According to an embodiment, the at least one sensor may include at least one of an image sensor, a proximity sensor, a fingerprint sensor, or a heart rate monitor (HRM) sensor.

According to an embodiment, the electronic device may further include a memory that stores information about the receive sensitivities of the plurality of antennas, which correspond to user grip types, and the at least one control circuit may detect a region of the electronic device, in which a user grip is made, based at least on the information stored in the memory and may deactivate at least one of the first array antenna and the second array antenna through the second communication circuit based at least on the detected region.

According to an embodiment, the user grip types may be stored in the memory in the form of an IQ value.

According to an embodiment, the first antenna array may include a first antenna pattern, the second antenna array may include a second antenna pattern, the first antenna pattern and the second antenna pattern may be electrically connected with the first communication circuit, and the at least one control circuit may obtain receive sensitivities of the first antenna pattern and the second antenna pattern through the first communication circuit, may detect an antenna pattern having a receive sensitivity lower than a specified level from among the first antenna pattern and the second antenna pattern, and may deactivate an array antenna including the detected antenna pattern from among the first array antenna and the second array antenna by using the second communication circuit.

An electronic device according to certain embodiments may include a first antenna that is disposed in a first region, a second antenna that is disposed in a second region, a first array antenna that includes a plurality of antenna elements and is disposed in the first region, a second array antenna that includes a plurality of antenna elements and is disposed in the second region, a first communication circuit that is electrically connected with the first antenna and the second antenna, a second communication circuit that is electrically connected with the first array antenna and the second array antenna, and at least one control circuit that is electrically connected with the first communication circuit and the second communication circuit. The at least one control circuit may identify whether there is gripped at least one region of the first region and the second region, by using at least one antenna of the first antenna and the second antenna through the first communication circuit, may perform communication by using the second array antenna through the second communication circuit when the first region is gripped, and may perform communication by using the first array antenna through the second communication circuit when the second region is gripped.

According to an embodiment, the at least one control circuit may obtain receive sensitivities of the first antenna and the second antenna through the first communication circuit and may identify whether there is gripped at least one region of the first region and the second region, based on the obtained receive sensitivities.

According to an embodiment, the at least one control circuit may calculate a difference between a first receive sensitivity being the highest and a remaining receive sensitivity based at least on the obtained receive sensitivities and may identify whether there is gripped at least one region of the first region and the second region, based on the obtained receive sensitivities when at least one receive sensitivity having a greater difference with the calculated first receive sensitivity than a specified level exists.

According to an embodiment, the electronic device may further include a grip sensor that detects whether a user grip is made, with respect to the first region and the second region, and the at least one control circuit may identify whether there is gripped at least one region of the first region and the second region, based on the obtained receive sensitivities and a result detected by the grip sensor.

According to an embodiment, the at least one control circuit may include at least one of an application processor (AP), a communication processor (CP), or a sensor hub.

An electronic device according to certain embodiments may include an antenna that is disposed in a specified region of the electronic device, an array antenna that is disposed in the specified region, a first communication circuit that is electrically connected with the antenna, a second communication circuit that is electrically connected with the array antenna, and at least one control circuit that is electrically connected with the first communication circuit and the second communication circuit. The at least one control circuit may control the first communication circuit so as to receive an electrical signal by using the antenna, may identify whether there is gripped the specified region, by using the antenna, may activate the array antenna through the second communication circuit when the specified region is not gripped, and may deactivate the array antenna through the second communication circuit when the specified region is gripped.

According to an embodiment, the at least one control circuit may obtain a receive sensitivity of the antenna through the first communication circuit and may identify whether the specified region is gripped, based on the obtained receive sensitivity.

According to an embodiment, the electronic device may further include a grip sensor that detects whether a user grip is made, with respect to the specified region, and the at least one control circuit may identify whether the specified region is gripped, based on the obtained receive sensitivity and a result detected by the grip sensor.

According to an embodiment, the at least one control circuit may identify the receive sensitivities based on at least one of a reference signals received power (RSRP), a reference signal received quality (RSRQ), a received signal strength index (RSSI), and a signal noise ratio (SNR).

According to an embodiment, the at least one control circuit may include at least one of an application processor (AP), a communication processor (CP), or a sensor hub.

According to certain embodiments, a method of searching for an optimum beam for communicating with an external electronic device by using a millimeter wave signal may include obtaining receive sensitivities of a plurality of antennas, activating at least one array antenna of a first array antenna and a second array antenna based at least on the obtained receive sensitivities, and forming at least one beam for communicating with the external electronic device, by using the activated at least one array antenna.

According to an embodiment, the method may further include calculating a difference between a first receive sensitivity being the highest and a remaining receive sensitivity based at least on the obtained receive sensitivities, and the activating of the at least one array antenna may include activating a remaining array antenna of the first array antenna and the second array antenna other than an array antenna adjacent to at least one antenna corresponding to a receive sensitivity of the at least one array antenna when at least one receive sensitivity having a greater difference with the calculated first receive sensitivity than a specified level exists.

According to an embodiment, the activating of the at least one array antenna may include activating both the first array antenna and the second array antenna when the at least one receive sensitivity having the greater difference with the calculated first receive sensitivity than the specified level does not exist.

According to an embodiment, the method may further include detecting a region of the electronic device, in which a user grip is made, by using at least one sensor, and deactivating at least one of the first array antenna and the second array antenna based at least on the detected region.

According to an embodiment, the method may further include detecting a region of the electronic device, in which a user grip is made, based at least on information about receive sensitivities of the plurality of antennas stored in a memory so as to correspond to user grip types and deactivating at least one of the first array antenna and the second array antenna based at least on the detected region.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, or hardware programmed with software, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, a time taken for the electronic device to search for an optimum beam for communicating with any other electronic device or a base station may decrease. Also, current consumption of the electronic device may decrease. The electronic device may provide an improved communication performance and an extended battery lifespan. Besides, a variety of effects directly or indirectly understood through this disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a plurality of antennas, wherein each of the plurality of antennas are spaced apart from each other, the plurality of antennas including a first antenna and a second antenna;
a first communication circuit electrically connected with the plurality of antennas and configured to transceive signals with frequencies under 6 GHz through the plurality of antennas;
a first array antenna disposed adjacent to the first antenna;
a second array antenna disposed adjacent to the second antenna;
a second communication circuit electrically connected with the first array antenna and the second array antenna and configured to provide communication according 5th generation mobile communication; and
at least one control circuit electrically connected with the first communication circuit and the second communication circuit, wherein the at least one control circuit is configured to:
obtain reception sensitivities of the plurality of antennas through the first communication circuit, the reception sensitivities including first reception sensitivity of the first antenna and second reception sensitivity of the second antenna;
when a difference between the first reception sensitivity and the second reception sensitivity, which is lower than the first reception sensitivity, is greater than a specified level, activate the first array antenna adjacent to the first antenna using the second communication circuit; and
perform a beam scan to detect a beam from a base station by forming at least one beam using the first array antenna without using the second array antenna.

2. The electronic device of claim 1, wherein the at least one control circuit is configured to:
activate both the first array antenna and the second array antenna by using the second communication circuit when the difference is within the specified level, and
perform the beam scan by using the first array antenna and the second array antenna.

3. The electronic device of claim 1, wherein the at least one control circuit is configured to:
deactivate a remaining array antenna of the first array antenna and the second array antenna other than the activated at least one array antenna by using the second communication circuit.

4. The electronic device of claim 1, wherein the at least one control circuit identifies the reception sensitivities based on at least one of a reference signals received power (RSRP), a reference signal received quality (RSRQ), a received signal strength index (RSSI), or a signal noise ratio (SNR).

* * * * *